A. A. THIELE.
TROLLEY REEL.
APPLICATION FILED MAR. 2, 1920.
1,420,350.
Patented June 20, 1922.
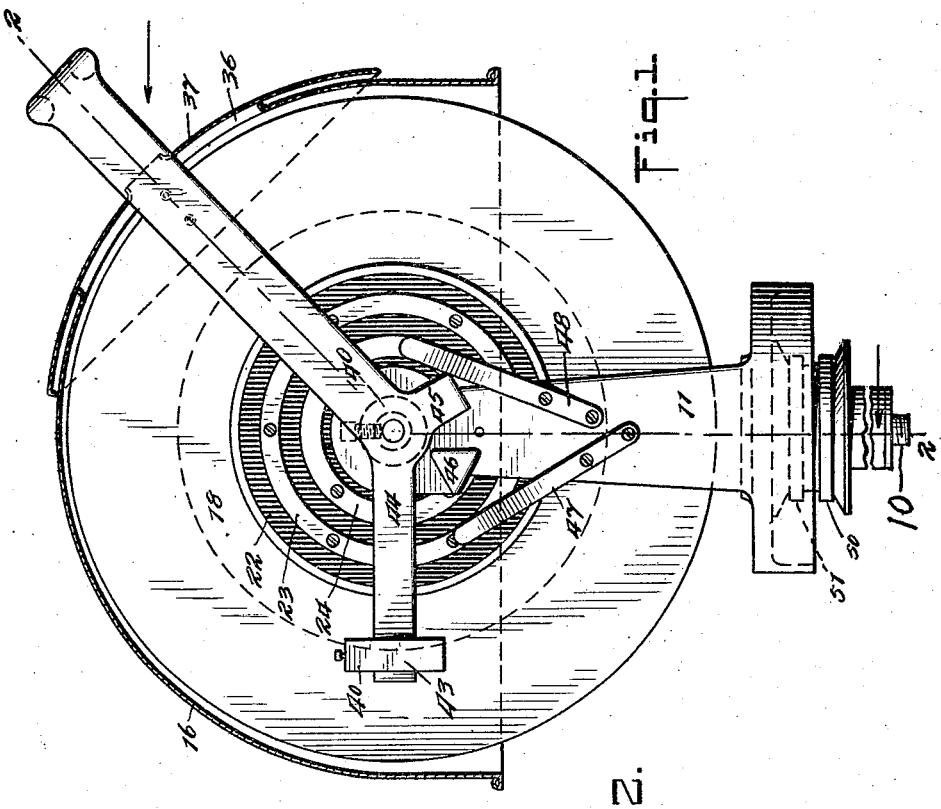
WITNESSES:
INVENTOR
Adolph A. Thiele
BY
Albert M. Austin.
ATTORNEYS

UNITED STATES PATENT OFFICE.

ADOLPH ARTHUR THIELE, OF OMAHA, NEBRASKA, ASSIGNOR TO AMERICAN SMELTING AND REFINING COMPANY, OF NEW YORK, N. Y., A CORPORATION OF NEW JERSEY.

TROLLEY REEL.

1,420,350.     Specification of Letters Patent.     Patented June 20, 1922.

Application filed March 2, 1920. Serial No. 362,696.

*To all whom it may concern:*

Be it known that I, ADOLPH ARTHUR THIELE, a citizen of the United States, and resident of Omaha, in the county of Douglas and State of Nebraska, have invented certain new and useful Improvements in Trolley Reels, of which the following is a specification.

The invention relates in general to a flexible connection between a source of electric current and some current utilizing device which is movable relative to the source and the invention specifically relates to a reel for taking up the slack in the flexible conductor supplying a trolley truck.

For the purpose of illustrating one practical location in which the device may be utilized, reference is made to my copending application on a power driven lead truck, Serial No. 364,853, filed under even date. This application discloses a trolley truck, the motor of which is connected with an overhead trolley track by means of a take-up reel of the type which particularly forms the subject matter of this disclosure.

One of the objects of the invention is to provide a simple form of reel which will maintain an electric connection between the conductor wound thereon and the relatively fixed support for the same during all relative movements of the parts at opposite ends of the conductor.

Another object of the invention is to provide in such a form of reel a mounting which will promptly take up any slack in the conductor and which will maintain the played out portion of the conductor free of kinks or twists as the support for the reel is moved about from place to place in the actuation of the device to which it is attached.

Still another object of the invention is to provide a flexible means for guiding the movement of the conductor as it is drawn on or played off from the reel and which guiding means will be further utilized as a convenient lever for rotating the reel bodily about one or more of its axis of rotation.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in side elevation of a reel constituting a preferred embodiment of the invention; and Figure 2 is a sectional view taken axially of the device and taken on the broken line 2—2 of Figure 1.

In the drawings there is disclosed a suitable form of support 10 which may be attached to or constitute part of the movable device which is designed to receive the supply of electric current, such as the truck disclosed in my copending application above identified.

A relatively strong frame 11, in the form of a braced casting is rotatably mounted on the support 10 for rotary movement about a vertical axis indicated by the line *a—b* so that the frame 11 will be free to turn about this axis in the horizontal movements of the support 10. The frame 11 includes a pair of upstanding arms 12 and 13, the upper portions of which are enlarged to form bearings 14 for a centrally disposed, horizontally extending shaft 15 which projects at opposite ends exteriorly of the bearings. The frame 11 is provided with a semi-disk shaped form of hood 16 formed of relatively light sheet metal and attached to the arms 12 and 13 by means of screws 17. A built up rotary member 18 is mounted loosely upon the portion of the shaft between the bearings 14 and includes at one side a relatively heavy commutator plate 19 which is provided with a relatively long hub 20 extending a material distance along the shaft so as to minimize distortional strains by the rotary member on the shaft. The outer face of the plate is provided with an annular flange 21 forming an annular pocket in which is disposed a commutator 22 of the face plate type. The commutator includes a pair of exposed conducting commutator rings 23 and 24 concentrically disposed relative to the axis of the shaft. The inner side of the plate 19 is provided with a drum spacing plate 25 of less diameter than the plate 19. The plate 25 is encircled by an annular band 26. The edge of the band plate 19 is provided with an upstanding flange 27 fastened to the inside of the band by rivets 28 and coacting with the outer portion of the plate 19 to provide drum flanges for the drum formed therebetween. The drum is designed to have a flexible conductor 29 wound thereon, which conductor is in the form of the usual two wire cable. One of the wires is connected by means of a binding post 30 to the ring 23 and the other wire is similarly connected by means of the binding post 31 to the other ring 24. In this way it will be seen that the cable wound on the drum is at all times in electric contact with the exposed commutator rings.

A spring housing 32 occupies the portion of the shaft between the hub 20 and the opposite bearing 14. The housing is formed of a casing 33 with one end screwed onto the hub 20 and the opposite end closed by means of a face plate 34 screwed into the same. A spring 35 preferably of the two-part type usually found in spring motor driven phonographs is positioned between the housing and the shaft and acts therethrough upon the drum to cause the drum to rewind the conductor thereon when the conductor has been drawn off of the reel during the working of the device.

The hood 16 is provided along its upper portion with a relatively long opening 36. This opening is covered by means of a sliding hood 37 which in turn is fitted within the upstanding sides 38 of a guiding arm 39. The side portions 38 of the arm are enlarged at their lower ends to form bearings 40 loosely mounted upon the outer end of the shaft 15 and held thereto by means of cotter pins 41. The outer end of the arm 39 is provided with a guiding ring 42 through which the conductor 29 is threaded. It will be seen by this construction that any tendency of the conductor to bear on the arm will cause the same to give under any such pressure and to swing about the axis of the shaft 15 carrying with it the hood 37 and maintaining the part of the drum secure from the infiltration of snow, ice, or dust.

For the purpose of maintaining the arm 39 in a normal position a counterweight 43 is slidably mounted upon a horizontally extending arm 44 projecting laterally from the hub portions 38 shown more particularly in Figure 1.

To prevent an abnormal movement of the arm 39 it is provided with a stop lug 45 which is caused to engage a stop 46 fixed on the support frame 11.

The side 12 of the frame on the side thereof facing the commutator is provided with a pair of brushes 47 and 48 which are in bearing engagement respectively with the exposed sides of the commutator rings 23 and 24, so as to convey the current from the flexible conductor 29 to the rotatably mounted supporting frame.

For the purpose of conveying the current across the joint providing for the movement of the frame about a vertical axis, a horizontally disposed form of ring commutator 49 is disclosed. It will be understood that this commutator is provided with commutator rings 50 and 51 which are connected respectively by conductors 52 and 53 with the brushes 47 and 48. It will of course be understood that the rings 50 and 51 are provided with brushes carried by the support 10 and arranged to transmit current from the rotatably mounted frame 11 to its support 10 in all relative positions of these two members.

In operation and assuming that the free end of the conductor 29 is suitably connected to either the source of electric current or to the electrically actuated device and that correspondingly the brushes engaging the rings 50 and 51 are connected either with a source of electric current or an electrically actuated device as was described in the above identified application the device is ready for use and the parts of the device actuated therefrom may be moved relative to each other, if this relative movement is such a movement as will increase the distance between the devices, the flexible conductor will simply unreel from the drum, placing the springs 32 under tension. As the members tend to approach each other and thus create a slack in the cable, the springs will reassert themselves and wind the surplus part of the conductor back onto the drum. If this relative movement between the members is such as to cause the conductor to extend at an angle, to the plane of the drum, it will bear on the guiding arm and tend to raise or lower the same from the normal position illustrated, or, if it is a movement horizontally the conductor will act on the reel tending to rotate the same about its vertical axis $a-b$. It will thus be understood that the conductor will automatically reset the reel into that position which will provide for an easy drawing up or playing out of the flexible conductor.

The parts are designed so as to be readily demounted for repair or substitution of parts and all of the springs are protected from dirt and may be contained in an oil compartment if desired. All of the parts are protected as far as is convenient from the action of rain, ice, dirt, or other agencies which may deleteriously effect either the mechanical or the electrical operation of the device.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a frame, a horizontally disposed shaft carried thereby, a drum carried by said shaft and adapted to have a conductor wound thereon, a commutator plate fixed to one side of the drum to rotate therewith, said plate provided with a commutator including a conducting ring, a connection extending through the plate and provided with means for engaging the conductor, a relatively fixed brush in bearing engagement with said ring, a spring housing concentric with the drum and a spring within said housing connecting the shaft with the drum.

2. In a device of the class described, the combination of a frame, a horizontally disposed shaft carried thereby, a drum carried by said shaft and adapted to have a conductor wound thereon, a commutator plate fixed to one side of the drum to rotate therewith, said plate provided with a commutator including a conducting ring, a connection extending through the plate and provided with means for engaging the conductor, a relatively fixed brush in bearing engagement with said ring, a spring housing concentric with the drum, a spring within said housing connecting the shaft with the drum and a guiding arm loose on the shaft adapted to guide the portion of the conductor fed to the drum.

3. In a trolley reel, the combination of a ring commutator plate mounted for rotary movement about an axis of rotation, a face plate commutator provided with a pair of exposed concentric rings on one face of the plate, a drum fixed to the opposite face of the plate and adapted to have a flexible conductor wound thereon, means carried by the plate for connecting the conductor electrically to one of the rings, a relatively fixed brush slidably engaging said commutator ring and a spring for controlling the plate contained largely within the outlines of the drum.

4. In a trolley reel, the combination of a support, a shaft carried by the support, a drum loosely mounted on the shaft, a flexible conductor wound on the drum, a commutator carried by the drum and connected electrically to the conductor, a brush carried by the support and engaging the commutator to provide an electric connection between the wound conductor and the fixed brush and a guiding arm pivotally mounted on the shaft to swing about the axis thereof and provided with means in spaced relation to the shaft for engaging the portion of the conductor adjacent the same.

5. In a device of the class described, the combination of a support, a frame mounted thereon for free rotary movement about a vertical axis, a drum mounted on the frame for movement about a horizontal axis and adapted to have an electric conductor wound thereon, an electric connection leading from the drum in all positions thereof to the support and a hood movable with the drum for protecting the same in all positions thereof.

6. In a device of the class described, the combination of a support, a frame mounted thereon for free rotary movement about a vertical axis, a drum mounted on the frame for movement about a horizontal axis and adapted to have an electric conductor wound thereon, an electric connection leading from the drum in all positions thereof to the support and a hood movable with the drum for protecting the same in all positions thereof, said hood provided with an opening adapted to have part of the conductor on the drum passed therethrough.

7. In a device of the class described, the combination of a support, a frame mounted thereon for free rotary movement about a vertical axis, a drum mounted on the frame for movement about a horizontal axis and adapted to have an electric conductor wound thereon, an electric connection leading from the drum in all positions thereof to the support and a hood movable with the drum for protecting the same in all positions thereof, said hood provided with an opening adapted to have part of the conductor on the drum passed therethrough and means for counterbalancing the hood.

8. In a device of the class described, the combination of a support, a drum mounted thereon, a flexible conductor wound on said drum and having a part leading therefrom, a guiding arm movable about the axis of the drum and provided with a guiding ring for receiving the part of the conductor leading from the drum.

9. In a device of the class described, the combination of a support, a drum mounted thereon, a flexible conductor wound on said drum and having a part leading therefrom, said arm provided with means tending to maintain the same in a normal position.

10. In a device of the class described, the combination of a support, a drum mounted thereon, a flexible conductor wound on said drum and having a part leading therefrom, means for covering the drum, said means provided with an opening, a sliding hood in all positions thereof covering said opening and provided with means for permitting the part of the conductor leading from the drum to pass therethrough and said hood adapted to be acted on by said conductor part and to be thus shifted by the part of the conductor which passes therethrough.

11. In a device of the class described, the combination of a support, a drum mounted thereon, a flexible conductor wound on said drum and having a part leading therefrom, means for covering the drum, said means provided with an opening, a sliding hood in all positions thereof covering said opening and provided with means for permitting the part of the conductor leading from the drum to pass therethrough and said hood adapted to be acted on by said conductor part and to be thus shifted by the part of the conductor which passes therethrough and means for limiting the shifting movement of the sliding hood.

12. In a device of the class described, the combination of a drum mounted for free rotary movement about both a vertical and horizontal axis and adapted to have a flexible conductor wound thereon with a portion extending therefrom, a guiding ring for said extending portion disposed to direct said portion in a line tangent to the circumference of the portion wound on the drum, said ring mounted for movement in a circle circumferentially of the drum.

13. In a device of the class described, the combination of a frame including two upstanding arms, a shaft fixed thereto, a drum and a spring housing both loose on the portion of the shaft between the arms and held thereby from movement longitudinally of the shaft, a spring in said housing connecting the same with the shaft to turn the drum, a commutator carried by the drum and means for connecting the commutator electrically with a conductor on the drum.

14. In a device of the class described, the combination of a support, a frame mounted thereon for rotary movement about a vertical axis, a ring commutator carried by the frame adjacent the support, said frame including a pair of upstanding arms, a drum journalled between the arms for movement about a horizontal axis and adapted to have a flexible conductor wound thereon, a face commutator carried by the drum, means including a binding post for connecting the drum commutator to the flexible conductor wound on the drum and a conductor disposed within the outlines of the frame for electrically connecting both commutators.

15. In a device of the class described, the combination of a support adapted to be moved in space, a drum mounted thereon for rotary movement about two axes at right angles to each other, a flexible cable wound on said drum, conducting means leading to the support from the cable in all positions of the drum, a portion of said cable leading from the part thereof wound on the drum, an upwardly facing guiding ring positioned above the drum with said portion of the cable threaded upwardly therethrough, said ring being flexibly mounted to give in one direction and means tending to prevent a lowering movement of the ring.

Signed at Omaha, in the county of Douglas and State of Nebraska, this 11th day of February A. D. 1920.

ADOLPH ARTHUR THIELE.